United States Patent [19]
Williams et al.

[11] 3,978,969
[45] Sept. 7, 1976

[54] METHOD AND APPARATUS FOR THE MANUFACTURE OF FILTER-TIPPED CIGARETTES

[75] Inventors: Robert Ernest Williams; Clifford Russell Marritt, both of London, England

[73] Assignee: Molins Limited, London, England

[22] Filed: July 16, 1974

[21] Appl. No.: 489,025

[30] Foreign Application Priority Data
July 17, 1973 United Kingdom............... 33950/73

[52] U.S. Cl................................ 198/461; 198/612; 198/626; 131/34
[51] Int. Cl.²........................................ B65G 47/00
[58] Field of Search................. 198/20 C, 162, 165, 198/160, 103, 102, 25, 34; 131/34, 61 A

[56] References Cited
UNITED STATES PATENTS

| | | | |
|---|---|---|---|
| 2,010,486 | 8/1935 | Herrmann | 198/20 C |
| 2,142,271 | 1/1939 | Herrmann | 198/20 C |
| 2,862,606 | 12/1958 | Schlichting | 198/165 |
| 3,009,557 | 11/1961 | Jackson | 198/20 C |
| 3,136,320 | 6/1964 | Molins et al. | 198/20 C |
| 3,367,341 | 2/1968 | Skala | 198/25 X |
| 3,726,388 | 4/1973 | Petrovas et al. | 198/165 |
| 3,850,213 | 11/1974 | Keaton | 198/165 |

FOREIGN PATENTS OR APPLICATIONS
348,642   10/1960   Switzerland........................... 131/94

*Primary Examiner*—L. J. Paperner
*Assistant Examiner*—James M. Slattery
*Attorney, Agent, or Firm*—John C. Smith, Jr.

[57] ABSTRACT

In order to feed a stream of filter rods forward at regularly spaced intervals a substantially continuous stream of rods is fed to a pair of opposed belts which grip the sides of the rods and accelerate them so as to space them apart. The spaced apart rods may then be accurately fed forward by a timing device in the form of a wheel having extending fingers which engage behind the rods and feed them forward at a controlled speed. A second pair of belts may be positioned between the first pair of belts and the timing device, these belts gripping the rods at the top and bottom. The continuous stream of rods is preferably formed by successively stripping groups of rods axially from a fluted drum.

21 Claims, 2 Drawing Figures

U.S. Patent  Sept. 7, 1976  3,978,969
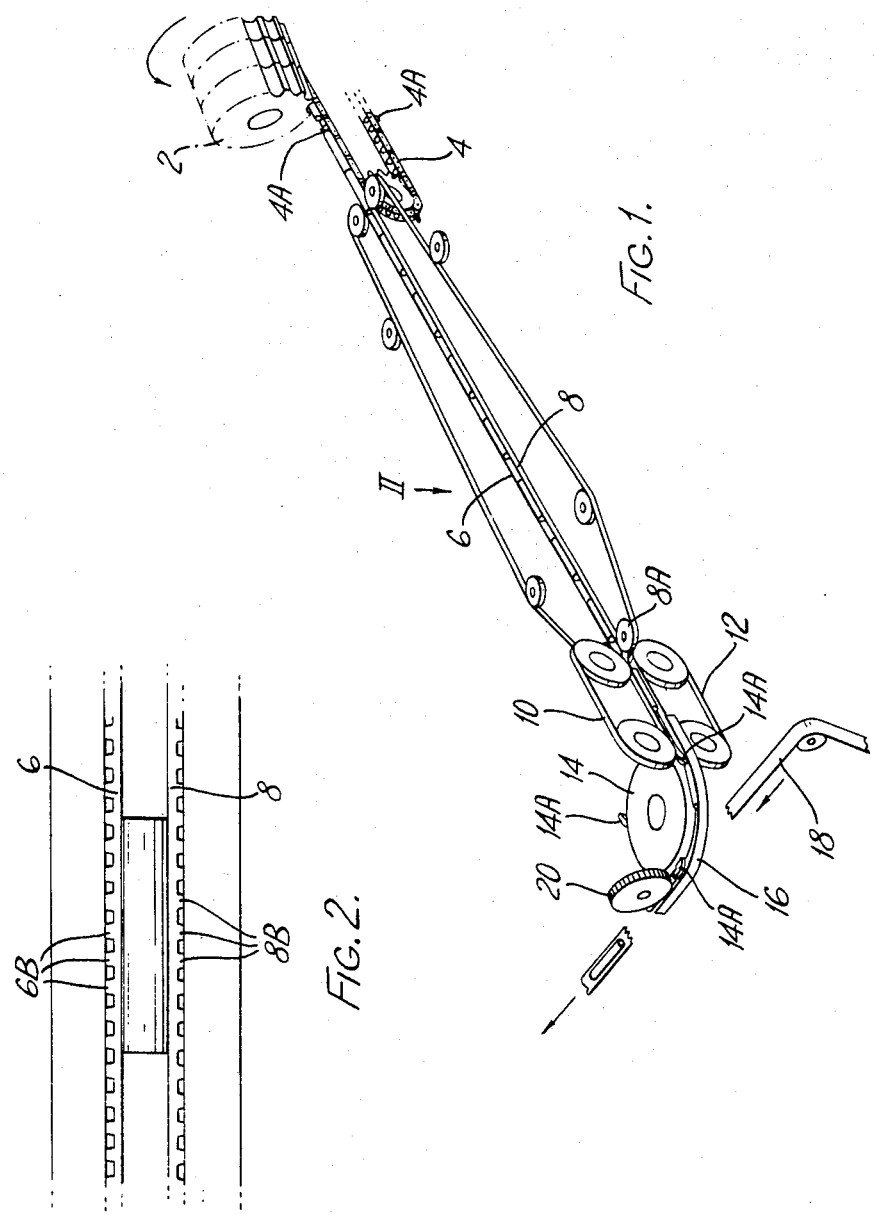

METHOD AND APPARATUS FOR THE MANUFACTURE OF FILTER-TIPPED CIGARETTES

This invention is concerned with feeding a stream of axially moving rod-like articles, especially filter rods, at regularly spaced intervals. A particular use for this invention is in connection with the manufacture of filter-tipped cigarettes by forming a stream of alternate tobacco and filter sections which is enclosed in a continuous wrapper and is then cut at regular intervals to form the finished cigarettes. Examples of such methods of manufacture are described in British patent applications Ser. Nos. 50492/71, 19712/72 (German OS Nos. 2,253,096, 2,253,097) and 25738/73.

The present invention provides apparatus for feeding rod-like articles at a controlled rate comprising means for supplying a stream of axially-moving rod-like articles, a pair of cooperating belts for receiving said articles from said supply means and arranged such that in use said articles are gripped between the belts and accelerated thereby to space said articles apart, and a timing device for receiving the spaced-apart articles and arranged to carry said articles forward at a controlled rate.

Preferably there are two pairs of timing belts. These may be arranged so that they grip the rod-like articles at positions angularly spaced by 90° relative to the axis of the articles. For example, the first pair may press the rods from the sides, while the second pair presses the rods from the top and bottom. The timing device is preferably a wheel rotating, for example, about a vertical axis and having circumferentially spaced fingers to feed the filter rods at regular intervals, for example directly onto the wrapper web.

Another aspect of the invention provides a method of feeding rod-like articles at a controlled rate comprising feeding a substantially continuous stream of said articles, gripping said articles at opposed positions and accelerating them to space them apart, conveying a stream of said spaced apart articles and subsequently engaging each article of said spaced-apart stream in turn to move said article forward at a controlled speed whereby the rate of supply of said articles is controlled.

An example of apparatus according to this invention is shown in the accompanying drawings. In these drawings:

FIG. 1 is a diagrammatic perspective view of the apparatus; and

FIG. 2 is a fragmentary plan view, at an enlarged scale, in the direction of the arrow II in FIG. 1.

The apparatus shown in the drawings includes a fluted drum 2 which receives multiple length filter rods in its flutes, the rods being cut by disc knives (not shown) to produce groups of say three or four filter rods in each flute. Each such filter rod is in fact a double-length filter.

A chain 4 with upstanding fingers 4A strips the groups of filter rods from the flutes of the drum 2 and feeds them axially. For this purpose, it will be understood that the path of the chain is inclined to the axis of the drum 2 at an angle related to the speeds of the drum and chain.

Each filter rod in turn is then gripped between two timing belts 6 and 8 which accelerate the filter rods and therefore space them apart axially. Each of the belts 6 and 8 moves round a number of pulleys rotating about vertical axes. The belts are driven by toothed pulleys, for example the pulley 8A for the belt 8 and an adjacent pulley (which is hidden from view) for the belt 6. FIG. 2 shows that the belts 6 and 8 are formed with teeth 6B and 8B for engagement with the toothed pulleys.

It will be seen that the belts 6 and 8 grip the filter rods from the sides so that the fingers 4A on the chain can pass between the belts. A second pair of similar timing belts 10 and 12 with horizontal-axis pulleys is arranged to receive the spaced filter rods from the belts 6 and 8 and to feed them further forward, while possibly further accelerating them, towards a timing device in the form of a wheel 14 having circumferentially spaced fingers 14A. The filter rods are driven forward by the fingers 14A at exactly predetermined intervals, being guided round the wheel by a fixed guide 16.

On leaving the wheel 14, the filter rods are pressed downwards onto a continuous wrapper web 18 by a knurled wheel 20. The wrapper may, for example, previously have spaced patches of adhesive applied to its upper surface so that the filter rods adhere to the wrapper web. Further downstream, sections of tobacco are fed between successive filter rods, after which the wrapper web is folded around the filter rods and tobacco sections and is sealed to form a continuous rod. This rod is then cut at regular intervals through the centres of the tobacco sections and filter rods to form individual filter-tipped cigarettes.

It will be understood that the stream of filter rods fed between the belts 6 and 8 are not at exactly regular intervals since successive groups are spaced apart at least by the thickness of each finger 4A on the chain 4. The final timing of the filter rods is achieved by the wheel 14. It is therefore important that the peripheral speed of the wheel 14 should be somewhat greater than the speed of the belts 10 and 12, so that each finger 14A on the wheel enters the space between successive filter rods and catches up and then accelerates the leading filter rod to feed it forward at the required timed interval in relation to the preceding filter rod.

We claim:

1. Apparatus for feeding rod-like articles comprising means for supplying a stream of axially-moving rod-like articles, a first pair of cooperating belts for receiving said articles from said supply means and arranged such that in use said articles are gripped between the belts and accelerated thereby to space said articles apart in an endwise-moving stream, a second pair of cooperating belts arranged in line with said first pair of belts to convey said spaced-apart articles in an endwise-moving stream from said first pair of belts, said second pair of belts being arranged to grip said rod-like articles in a plane substantially at 90° to the plane in which said first pair of belts grip said articles, and a timing device for receiving the spaced-apart articles from said second pair of belts and arranged to enter the spaces between the articles and engage the ends of successive articles to carry said articles forward at regular intervals in an endwise-moving stream.

2. Apparatus as claimed in claim 1 wherein the timing device is a rotatable wheel having circumferentially spaced radially extending fingers for feeding forward said rod-like articles at regular intervals.

3. Apparatus as claimed in claim 1 wherein said supply means comprises a fluted drum arranged to feed a group of rod-like articles in each flute, and a conveyor for moving the groups axially successively out of the flutes.

4. Apparatus as claimed in claim 3 wherein said conveyor comprises a chain having upstanding fingers to strip the groups out of the flutes.

5. Apparatus as claimed in claim 1 further comprising means for supporting a continuous wrapper web and in which the timing device is arranged to feed said rod-like articles towards said supporting means.

6. Apparatus as claimed in claim 5 in which a rotatable pressure wheel is arranged adjacent the timing device above said supporting means.

7. Apparatus as claimed in claim 1 in which each belt is formed with teeth for engagement with toothed pulleys on the side of the belt opposite to that arranged to grip the rod-like articles.

8. Apparatus as claimed in claim 1 further comprising means for driving said pair of cooperating belts and said timing device, said driving means being adapted to drive said timing device at a rate sufficient to feed said articles at a rate greater than the rate said articles are conveyed by said conveyor means.

9. A method of feeding rod-like articles at regular intervals comprising feeding a substantially continuous stream of said articles, accelerating said articles in two stages to space them apart and gripping each of said articles at different opposed positions in each stage of acceleration, conveying an endwise-moving stream of said spaced-apart articles, and subsequently engaging an end of each article of said spaced-apart stream in turn to carry said articles forward at regular intervals in an endwise-moving stream.

10. A method as claimed in claim 9 comprising gripping each of said articles at different opposed positions angularly spaced from each other by about 90° relative to the axis of said articles.

11. Apparatus for feeding filter rods at regular intervals comprising a fluted drum arranged to feed a group of filter rods in each flute; a conveyor for moving the groups axially successively out of the flutes; a first pair of substantially horizontally spaced opposed cooperating belts arranged to receive filter rods fed by said conveyor and to grip said rods on opposite sides and to accelerate said rods so as to space them apart in an endwise-moving stream; a second pair of substantially vertically spaced opposed cooperating belts arranged to receive the rods from said first pair of belts and to grip said rods at the top and bottom and feed them forward in an endwise-moving stream substantially in alignment with the stream conveyed by said first pair of belts; and a timing wheel rotatable about a substantially vertical axis and arranged to receive said rods from said second pair of belts, said timing wheel having a plurality of circumferentially spaced radially extending fingers arranged to enter the spaces between the rods and engage the ends of successive rods to feed said rods forward at regular intervals in an endwise-moving stream.

12. Apparatus as claimed in claim 11 wherein said supply means comprises a fluted drum arranged to feed a group of rod-like articles in each flute; and an endless conveyor lying in a substantially vertical plane and having upstanding fingers for stripping the groups axially successively out of the flutes.

13. Apparatus as claimed in claim 11 further comprising means for driving said pair of cooperating belts and said timing wheel, said driving means being adapted to drive said timing wheel at a rate such that said fingers feed said rods at a greater rate than the rate said rods are fed by said belts, whereby after entering the spaces between successive rods said fingers accelerate the rods upstream thereof.

14. Apparatus for feeding rod-like articles comprising means for supplying a stream of endwise-moving rod-like articles, a first pair of cooperating belts for receiving said articles from the supply means and arranged such that in use the articles are gripped between the belts in a first plane passing through their axes and are accelerated by the belts to space the articles apart in an endwise-moving stream; a rotatable timing wheel downstream of said first pair of belts for receiving spaced-apart articles, said timing wheel being rotatable in a plane substantially parallel to the first plane and having a plurality of circumferentially spaced radially extending fingers arranged to enter the spaces between the articles and engage the ends of successive articles to feed said articles forward at regular intervals in an endwise-moving stream; and a second pair of cooperating belts between said first pair of belts and said timing wheel and arranged to receive articles from said first pair of belts and to grip said articles in a second plane passing through their axes and deliver them in an endwise-moving stream to said timing wheel, said first and second pair of belts being in substantial alignment so that they convey said articles in substantially the same direction and said first and second planes being substantially at right angles.

15. Apparatus as claimed in claim 14 wherein said supply means comprises a fluted drum arranged to feed a group of rod-like articles in each flute, and a conveyor having upstanding fingers for stripping the groups axially successively out of the flutes, said conveyor lying in a plane substantially parallel to said second plane.

16. Apparatus as claimed in claim 14 further comprising means for driving said pair of cooperating belts and said timing wheel, said driving means being adapted to drive said timing wheel at a rate such that said fingers feed said rods at a greater rate than the rate said rods are fed by said belts, whereby after entering the spaces between successive rods said fingers accelerate the rods upstream thereof.

17. Apparatus for feeding rod-like articles in an axial direction at predetermined spaced intervals along a path and comprising:
   a. means for supplying a stream of axially-moving rod-like articles,
   b. conveyor means for receiving said articles from said supply means and for accelerating the axial movement of said articles along said path to space said articles apart; and
   c. timing means for receiving the spaced-apart articles, said timing means including means entering the spaces between successive articles for engaging one end of each successive article and feeding said articles in an axial direction along said path at predetermined regular intervals;
   d. said conveyor means comprising a first pair of cooperating belts arranged in a plane for gripping said articles received from said supply means between said belts at opposite sides of said articles and for accelerating axial movement of said articles along said path to space said articles apart and a second pair of cooperating belts arranged in a plane substantially perpendicular to the plane of said first recited pair of cooperating belts and arranged in line between said first pair of belts and said timing device for gripping said articles between said second pair of belts at different opposite sides of said articles and further accelerating the axial movement of said articles along said path to space said articles further apart.

18. Apparatus as claimed in claim 17 wherein said supply means comprises a drum arranged for rotation about its axis and including a plurality of flutes, each flute being adapted to retain a group of rod-like articles, and a conveyor for moving the groups successively in an axial direction out of the flutes along said path.

19. Apparatus as claimed in claim 18 wherein said conveyor comprises an elongated chain having transversely extending fingers to strip the groups out of the flutes.

20. Apparatus as claimed in claim 17 wherein said timing means comprises a rotatable wheel including circumferentially spaced radially extending fingers for feeding forward said rod-like articles at regular intervals.

21. Apparatus as claimed in claim 17 further comprising means for driving said conveyor means and said timing means, said driving means being adapted to drive said timing means at a rate such that said article-engaging means travels along said path at a greater rate than the rate said articles are conveyed by said conveyor means, whereby after entering the spaces between said articles said article-engaging means accelerates the articles upstream thereof.

* * * * *